(12) United States Patent
Pottebaum et al.

(10) Patent No.: US 6,477,000 B1
(45) Date of Patent: Nov. 5, 2002

(54) ACTUATOR ARM DISC SNUBBER WITH UNITARY CONSTRUCTION

(75) Inventors: Kenneth Lee Pottebaum, Yukon, OK (US); Roy Lynn Wood, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/001,788

(22) Filed: Dec. 31, 1997

Related U.S. Application Data
(60) Provisional application No. 60/054,936, filed on Aug. 7, 1997.

(51) Int. Cl.[7] ................................................. G11B 33/14
(52) U.S. Cl. .................................................. 360/97.02
(58) Field of Search ................................ 360/104, 105, 360/106, 107, 97.01, 97.02, 97.03, 98.01, 97.04

(56) References Cited

U.S. PATENT DOCUMENTS

| 4,843,503 A | * 6/1989 | Hazebrouck et al. ....... 360/106 |
| 4,939,611 A | 7/1990 | Connolly |
| 5,422,770 A | 6/1995 | Alt .............................. 360/105 |
| 5,801,899 A | * 9/1998 | Genheimer .............. 360/97.01 |

FOREIGN PATENT DOCUMENTS

JP           4-79085     * 3/1992

* cited by examiner

*Primary Examiner*—David Davis
(74) *Attorney, Agent, or Firm*—Fellars, Snider, et al.

(57) ABSTRACT

An apparatus and method for minimizing damage to a disc drive assembly subjected to non-operational shock. The disc drive has rotatable discs upon which data can be written and read by read/write heads supported by and controllable by an actuator assembly having actuator arms moveable over the complete data containing surfaces of the discs. A disc snubber is supported in apertures in the actuator arms, the disc snubber having bumper arms radially extending to nest the outer perimeters of the discs when the disc drive assembly is in its non-operational mode. The disc snubber is in clearing relationship to the discs in the operational mode. The disc snubber is disposed to dampen disc deflection caused by non-operational shock, thereby avoiding deleterious actuator arm/disc contact.

13 Claims, 4 Drawing Sheets

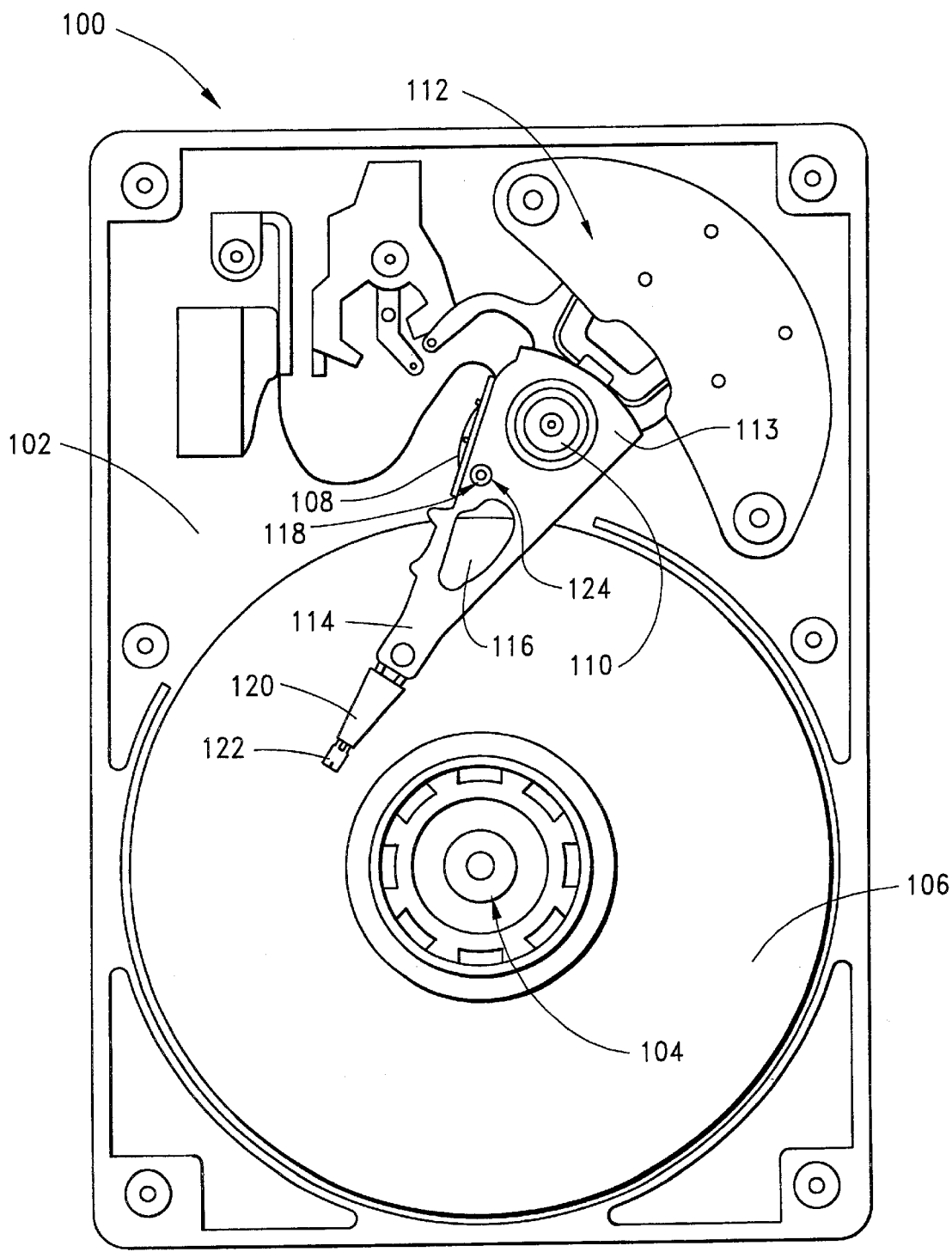
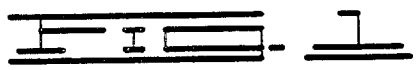

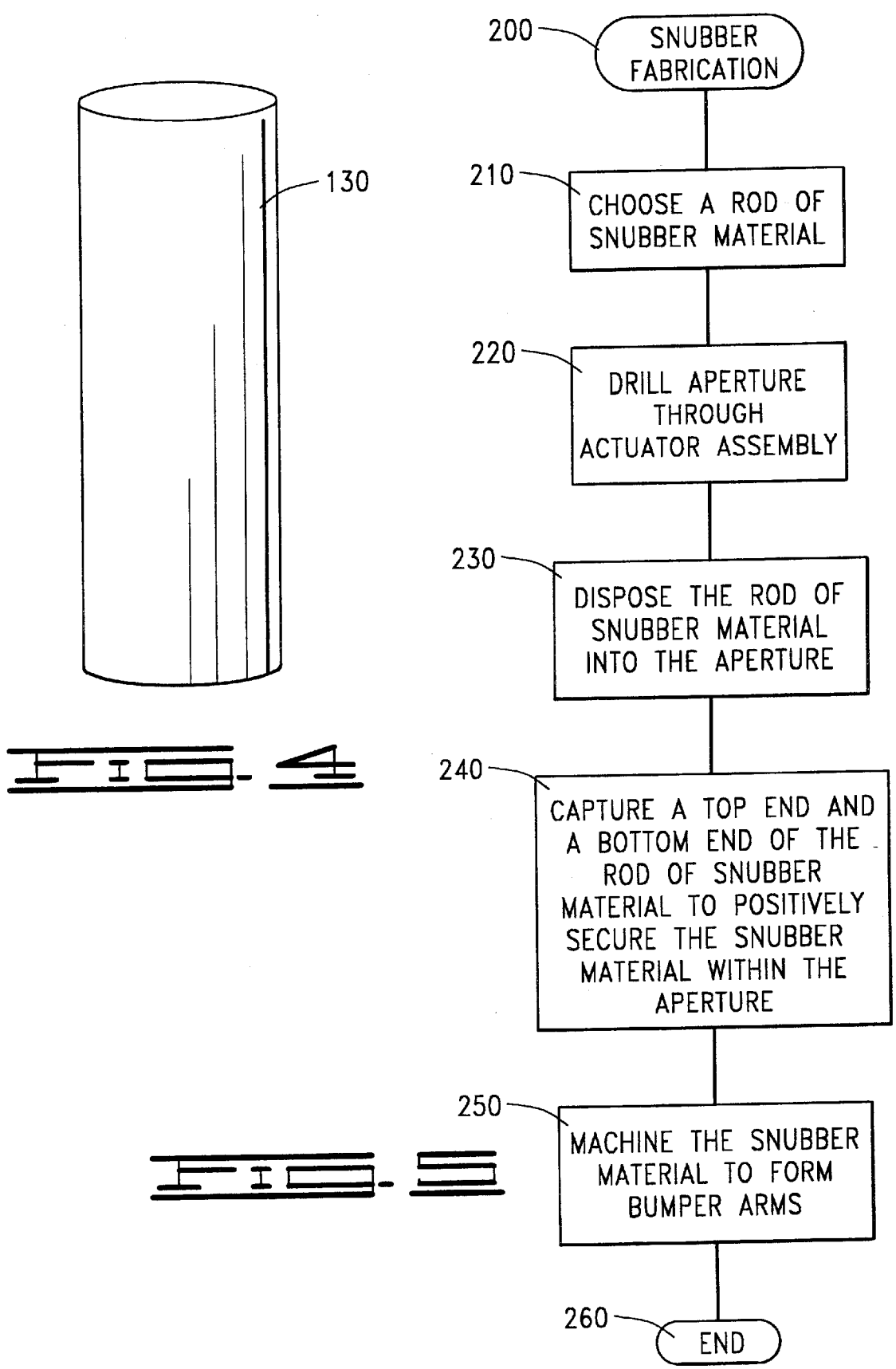

ACTUATOR ARM DISC SNUBBER WITH UNITARY CONSTRUCTION

RELATED APPLICATIONS

This application claims the benefit of United States Provisional Application No. 60/054,936 entitled SINGLE PIECE DISC SNUBBER FOR NON-OPERATING SHOCK PROTECTION, filed Aug. 7, 1997.

FIELD OF THE INVENTION

This invention relates generally to the field of disc drive data storage devices, and more particularly but not by way of limitation, to a disc snubber for protecting discs from damage due to nonoperational mechanical shocks.

BACKGROUND OF THE INVENTION

Hard disc drives enable users of computer systems to store and retrieve vast amounts of data in a fast and efficient manner. In a typical disc drive, the data is magnetically stored on one or more discs which are rotated at a constant high speed and accessed by a rotary actuator assembly having a plurality of read/write heads that fly adjacently the surfaces of the discs.

The heads are suspended from gimbal assemblies extending from arms of the rotary actuator assembly and include aerodynamic features that enable the heads to fly upon an air bearing established by air currents set in motion by the rotation of the discs. When the disc drive is deactivated, a shutdown operation is commenced wherein the heads are moved to a safe parking position before the discs come to a stop.

It is a continuing trend in the disc drive industry to provide disc drives with ever increasing data storage capacities using the same or a smaller form factor (i.e., outside dimensions) for the drives. As a result, successive generations of drives are often provided with discs that are closer together, reducing disc to actuator arm clearances. At the same time, disc drives are being utilized in harsher environments, such as portable computers, requiring increases in the robustness characteristics of the drives so as to withstand ever greater external vibrational and shock input levels. For example, a typical disc drive might be required to withstand up to a 200 g mechanical shock in a nonoperating mode.

Such mechanical shocks can cause significant deflection of the discs, leading to catastrophic damage to the disc media and heads. More particularly, disc to actuator arm contact can induce a shock wave large enough to travel down to the gimbal assemblies and heads, causing the heads to flex up off of the landing zones as a result of the relatively flexible gimbal assemblies to which the heads are attached. The heads can thus obtain significant velocities as they accelerate away from and then back toward the discs. When such velocities are sufficiently severe, damage can occur to the heads and the surfaces of the discs as the heads strike landing zones. Moreover, should a head tilt during such liftoff, a corner of the head can strike the disc surface, increasing probability of damage to the head or the disc.

Disc snubbers such as disclosed in the U.S. Pat. No. 5,422,770 issued Jun. 6, 1995 to Alt have been taught in the prior art in an attempt to limit the deflection of the discs of a disc drive subjected to large nonoperational shocks. However, it has been observed that localized snubbers such as disclosed by the Alt patent could be displaced upon application of a mechanical shock. Other attempts have been made in which isolators have been mounted by screws. Screws occupy significant space and create added cost and time in assembly and installation. In a relatively small computer such as a laptop, where space is limited, the added cost of assembly and installation of extra pieces defeats the purpose of a low cost, space efficient computer.

Accordingly, there is a need for an improved approach to minimizing damage to a disc drive as a result of nonoperational shock by limiting the ability of the discs to contact the arms of an actuator of the disc drive.

SUMMARY OF THE INVENTION

The present invention provides an apparatus and method for minimizing damage to a disc drive subjected to nonoperational mechanical shock.

In accordance with a preferred embodiment, the disc drive comprises a plurality of discs having data recording surfaces, a spindle motor for rotating the discs about a central axis and an actuator assembly supporting a plurality of controllably positionable heads adjacent the recording surfaces.

A disc snubber is disposed within a snubber aperture in the actuator assembly, and is disposed to nest the disc perimeters when the actuator assembly is in its head park position. The disc snubber comprises a body portion adapted to snugly fit within the snubber aperture, and a plurality of bumper arms extend radially from the body portion toward the actuator arms so that the bumper arms extend above and below the discs during non-operation. Furthermore, the bumper arms are coextensive with the actuator arms for a distance that provides protection from disc to actuator arm contact during disc deflection resulting from nonoperational shock while providing clearance during disc rotation.

The method of making the disc snubber comprises providing a snubber aperture through the actuator assembly, providing a rod of sufficiently rigid snubber material to be disposed with a snug fit in the snubber aperture, disposing the snubber material in the aperture, securing the rod of snubber material in the snubber aperture and machining the snubber material to form the bumper arms.

These and various other features as well as advantages which characterize the present invention will be apparent from a reading of the following detailed description and a review of the associated drawings.

BRIEF DESCRIPTION OF THE DRAWINGS

FIG. 1 is a top plan view of a disc drive shown with its top cover removed and having a disc snubber constructed in accordance with a preferred embodiment of the present invention.

FIG. 4 is a perspective view of a rod of bumper material.

FIG. 5 is a flowchart of a preferred embodiment method of making the disc snubber.

DETAILED DESCRIPTION

Figure 2:
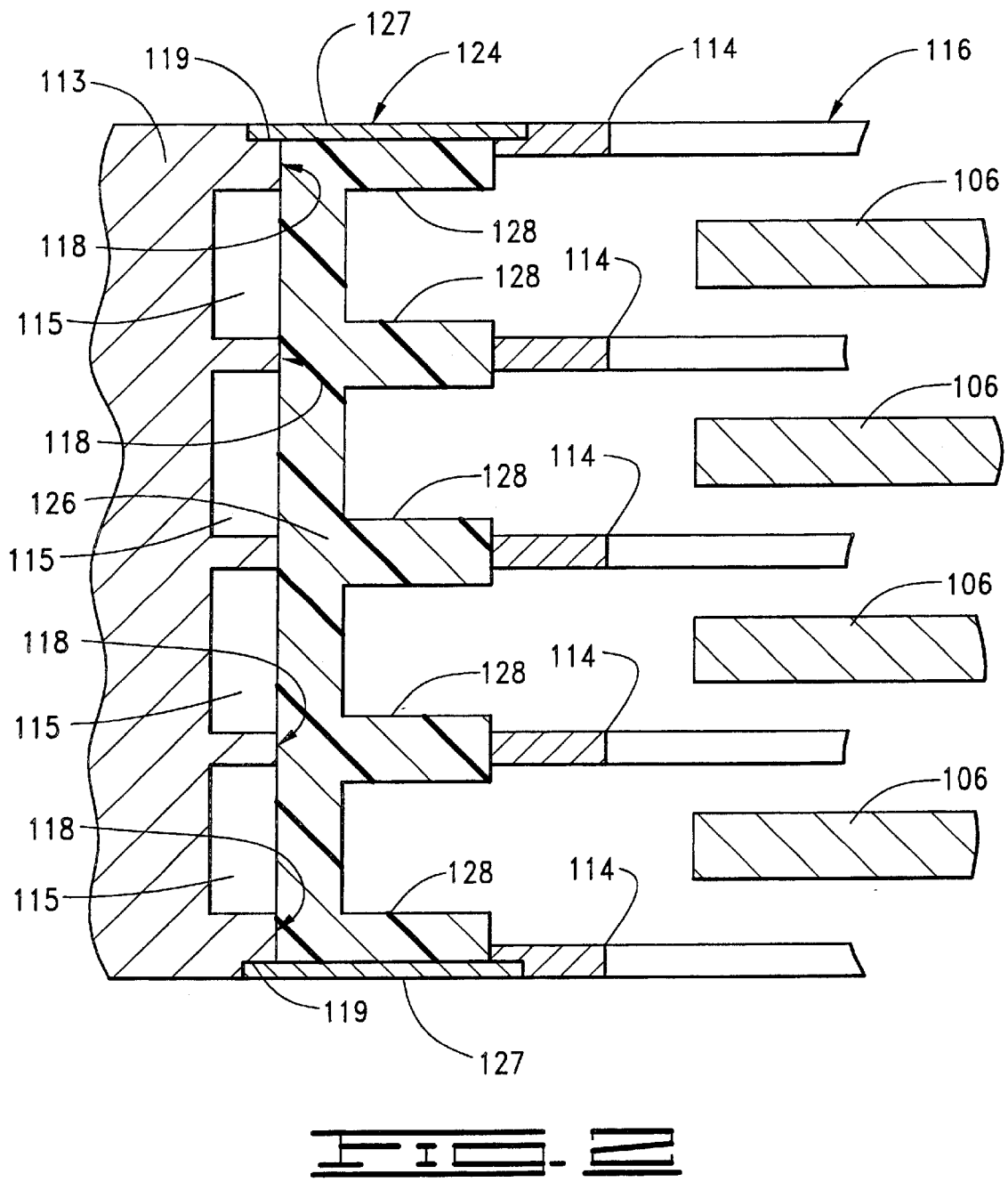
FIG. 2 is a partial cross-sectional, elevational view of the disc snubber disposed within a series of axially aligned snubber apertures in the actuator assembly of FIG. 1 during the operational stage of the disc drive.

Referring now to the drawings, and more particularly FIG. 1, shown therein is a disc drive assembly 100 constructed in accordance with a preferred embodiment of the present invention. The disc drive assembly 100 includes a base deck 102 on which various components of the disc drive assembly are mounted. A top cover (not shown) cooperates with the base deck 102 to form an internal, sealed environment for the disc drive assembly 100 in a conventional manner.

A spindle motor assembly 104 is provided to rotate a stack of discs 106 at a constant high speed (only the top disc is shown in FIG. 1). A controllably positionable actuator assembly 108, also referred to as an E-block, transfers data to and from the discs 106 while rotating about a cartridge bearing assembly 110 in response to currents applied to a coil (not separately designated) of a voice coil motor (VCM) 112. The actuator assembly 108 includes an actuator body 113 and a plurality of actuator arms 114 (the top most of which is shown) that extend into the stack of discs 106, each actuator arm 114 having an actuator arm aperture 116 and a series of axially aligned snubber apertures 118. The snubber apertures 118 can be placed in the middle of the actuator assembly 108 or at either of the outer edges of the actuator assembly 108 as a particular application requires. The snubber apertures 118 in both the top and bottom armature arms 114 are counter bored to have a recess bore 119.

Each of the actuator arms 114 has a corresponding flexure assembly 120 extending therefrom. Read/write heads 122 are supported at the distal ends of the flexure assemblies 120 in close proximity to the surfaces of the discs 106 and fly on air bearings established by air currents set up by the rotation of the discs 106.

Of particular interest in FIG. 1 is a disc snubber 124, which is generally a rod-shaped member extending through the cross-sectional extent of the actuator assembly 108 by way of the snubber apertures 118 in the actuator arms 114. As discussed in more detail below, the disc snubber 124 acts as a buffer between the actuator arms 114 and the discs 106 in the non-operational mode when mechanical shock energy deflects the discs 106 toward the actuator arms 114, thereby preventing damage that can result from arm to disc contact.

Figure 3:
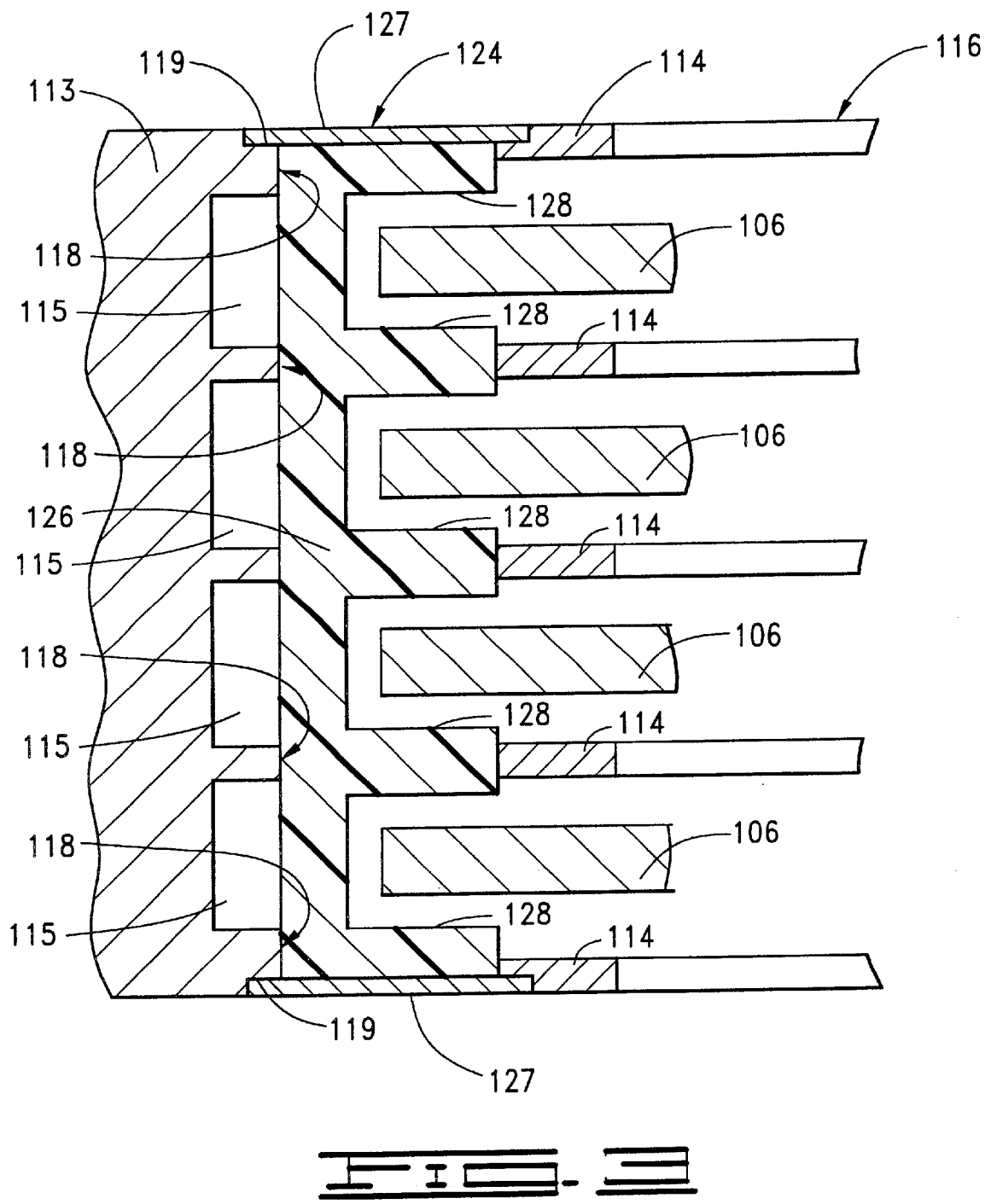
FIG. 3 is a partial cross-sectional, elevational view of the disc snubber disposed within a snubber aperture in the actuator assembly of FIG. 1 during the non-operational stage of the disc drive.

The disc snubber 124 is shown in enlargement and greater detail in FIGS. 2 and 3, which provide partial cross-sectional, elevational views of the disc snubber 124. As shown in FIGS. 2 and 3, the disc snubber 124 is disposed to extend through the snubber apertures 118 in the actuator arms 114. In FIGS. 2 and 3, five actuator arms 114 are depicted to facilitate the discussion and function of the disc snubber 124. Further, FIGS. 2 and 3 show four discs 106 adjacent the actuator arms 114. However, it will be recognized that the present invention is not limited by the number of discs 106 and corresponding actuator arms 114 depicted in both FIGS. 2 and 3.

More specifically, as shown in FIGS. 2 and 3, the disc snubber 124 has a snubber body 126 adapted to snugly extend through the snubber apertures 118 in the actuator arms 114 of the actuator assembly 108, the snubber apertures 118 sized to securely hold the disc snubber 124 in place. A snubber retainer member 127 is disposed in each of the counter bores 119 and adhered to opposing ends of the snubber body 126 such as by way of welding or an appropriate adhesive. Alternatively, the opposing ends of the snubber body 126 can be deformed (such as by thermal pressing) to secure the snubber body 126 in position within the snubber apertures 118. A gap 115 is formed as an intervening space between the snubber body 126, the actuator body 113, and the actuator arms 114, as shown in FIGS. 2 and 3.

A plurality of bumper arms 128 extend radially from the snubber body 126 such that the bumper arms 128 extend above and below the discs 106 as shown. Each bumper arm 128 is coextensive with one of the actuator arms 114, and the dimensional thickness of the bumper arm 128 is established to be greater than the thickness of its corresponding actuator arm 114; further, the thickness of the bumper arm 128 is determined such that the bumper arm 128 will be in clearing relationship to the discs 106 when discs 106 are nested between bumper arms in the manner described below for FIG. 3. As discussed below, the bumper arms 128 serve to prevent disc to actuator arm contacts that might result from mechanical shock to the disc drive assembly 100 when disposed in its non-operational mode.

Referring specifically to FIG. 2, the disc snubber 124 is depicted when the disc drive assembly 100 is in its operational mode, that is, when the discs 106 are being rotated at a high rate of rotation. As noted above, each of the bumper arms 128 is coextensive with one of the actuator arms 114. During operation, the disc snubber 124 is disposed by the actuator assembly 108 to always be at a clearance distance from the outer perimeters of the discs 106, thereby preventing undesired contact between the discs 106 and the disc snubber 124 while the discs 106 are being rotated.

Referring now to FIG. 3, the disc snubber 124 is depicted when the disc drive assembly 100 is in its non-operational mode, that is, when the discs 106 are stationary and the actuator arms 114 are in a parked position. As mentioned, each of the bumper arms 128 is coextensive with one of the armature arms 114, and as shown, the bumper arms 128 are disposed to mesh in clearing relationship to the discs 106. In the disc drive assembly 100, the actuator arms 114 are parked during the non-operational mode at the inner diameters of the discs 106, and the outer perimeters of the discs 106 nest between the bumper arms 128. Thus, the bumper arms 128 radially extend directly above and below the surfaces of the discs 106 proximal to their outer perimeters. In this position, the bumper arms 128 can significantly dampen disc deflection from mechanical shock during the nonoperational mode of the disc drive assembly 100.

Having discussed the location and function of the disc snubber 124, the method of forming the disc snubber 124 will now be discussed. Referring to FIG. 4, shown therein is a rod 130 composed of a suitable snubber material. The rod 130 is preferably fabricated from a non-marring, nonparticulating polymeric material such as Delrin®, a registered trademark of E. I. Du Pont De Nemours and Company, or Carilon®, a registered trademark of Shell Oil Company.

Provided in FIG. 5 is a flowchart 200 depicting the preferred method of disc snubber fabrication. The first step 210 is the selection of the appropriate material and the forming of the snubber rod 130 depicted in FIG. 4. The snubber 130 should be of sufficient rigidity to dampen the discs 106 without damaging either the discs 106 or the snubber 124. As mentioned, materials believed to be suitable are Delrin®, a registered trademark of E. I. Du Pont Nemours and Company, or Carilon®, a registered trademark of Shell Oil Company, as these materials have the desired resiliency and dampening characteristics for the snubber 124, and the snubber rod 130 can readily be shaped from these materials such as by machining or other forming techniques.

The next step 220 is that of providing coaxially aligned apertures 118 through the actuator arms 114, such as by drilling or other machining techniques. The shape and size of the snubber apertures 118 are selected to accommodate the size and cross-sectional shape of the snubber rod 130. The next step 230 involves the disposition of the snubber rod 130 into the snubber apertures 118 that is sized to accommodate the rod of material 130. Once the snubber rod 130 is inserted into the snubber apertures 118, the step 340 requires that the top end and the bottom end of the snubber 130 are captured to positively secure the snubber rod 130 in place so as to prevent displacement of the disc snubber 124. This is achieved by adhering the snubber retainers 127 to opposing ends of the snubber rod 130 with the snubber retainers 127 being disposed within the counterbore 119, and preferably the dimensions of the snubber retainers 127 and the counterbore 119 are determined to make the outer surfaces of the snubber retainers 127 to be flush with the outer surfaces of the actuator arms 114. Alternatively, the opposing ends of the snubber rod 130 can be deformed (such as by thermal pressing) in lieu of the snubber retainers 127.

With the snubber rod 130 inserted in, and secured within, the snubber apertures 118, the next step 250 (to end 260) calls for machining away portions of the snubber rod 130 to form the snubber body 126 and the bumper arms 128 that radially extend therefrom. The bumper arms 128 can be formed by cutting slots into the cylindrical snubber rod 130 along one side only, and by setting the depth and orientation of the slots between the bumper arms 128 to nest the outer perimeters of the discs 106 as shown in FIG. 3.

While the above method is the presently preferred one, it is also possible to precut or preform the snubber rod 130 to form the snubber body 126 and bumper arms 128 prior to inserting into the snubber apertures 118. If this is done, it may be desirable to form the bumper arms 128 by lathe cutting (of by otherwise forming) concentric grooves in the snubber rod 130, thereby forming the snubber arms 128 to have the shape of radially extending, symmetrical shelves about the snubber body 126. The advantage of this is that the disc snubber 120 can be formed as a symmetrical part about its longitudinal axis; this facilitates orientation of the disc snubber 120 when inserting it into the snubber apertures 118 so that the snubber arms 128 are properly disposed relative to the discs 106.

The present invention contemplates that the snubber aperture 118 can be located at any position on the actuator assembly (such as 108) so long as the symmetry and balance of the actuator arms 114 are maintained. It is also contemplated that the disc snubber 124 can be of any convenient shape as may be required in any particular application. Further, it is contemplated that the placement of the actuator arms 114 at a parking position other than that designated, that is, at or near the outside of the surfaces of the disc 106 without diminishing the benefits of the disc snubber 124.

Accordingly, the present invention provides several useful advantages over the prior art. First, the disc snubber 124 is installed at the roots of the actuator arm 114, thereby strengthening the actuator arms 114 while serving as a protection against disc to actuator arm contact during the non-operational mode of the disc drive assembly 100. And as mentioned above, the disc snubber 124 is secured away from the data tracks of the disc 106 during the operational mode of the disc drive assembly 100, thereby providing full and free access to all of the data tracks on the discs 106.

Another advantage of the present invention is that the placement of the disc snubber 124 directly above and below the outer perimeters of the discs 106 serves to dampen the deflection at its origin, the outer perimeters of the discs 106, thereby protecting from actuator arm/disc contact at the most efficacious point. Along with protecting the actuator arms 114 from damage, dampening disc deflection at its origin can also prevent harmful actuator arm vibrations that can result in damage to both the heads 122 and the discs 106.

The stability of the disc snubber of the present invention is yet another advantage. The unitary, or one-piece, configuration of the disc snubber 124 can improve the positioning accuracy of the disc snubber 124 within the snubber apertures 118 while preventing possible displacement of the bumper arms 128. Moreover, elimination of mounting means such as that of additional mounting screws or pins prevent displacement of the disc snubber from the effects of differential thermal expansion of the disc snubber and the actuator assembly. And, the preferred method of forming the disc snubber 124 provides for better accommodation to manufacturing tolerances.

Lastly, it should be noted that a significant consideration in the manufacturing of disc drives (such as 100) is the time and expense of production. The present invention allows. a low-cost alternative to prior art snubber devices because the installation of the disc snubber of the present invention does not significantly retard the disc drive assembling process because the disc snubber can be mounted into the actuator assembly by the vendor of the actuator assembly.

In accordance with the foregoing discussion, it will be recognized that the present invention is directed to an apparatus and method for minimizing damage to a disc drive assembly (100) subjected to non-operational shock. The disc drive comprises rotatable discs (106) upon which data can be written and read by read/write heads (122) supported by a controllable actuator assembly (108) having actuator arms (114). A disc snubber (124) is supported in apertures (118) in the actuator arms, the disc snubber having bumper arms (128) radially extending to nest the outer perimeters of the discs when the disc drive assembly is in its non-operational mode. The disc snubber, via the bumper arms, are disposed to dampen the deflection of the discs caused by non-operational shock, thereby avoiding actuator arm/disc contact that can deleteriously damage the discs, the actuator arms and the heads.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a disc drive assembly comprising a rotatable disc and an actuator assembly comprising an actuator body rotatable about an actuator axis and first and second actuator arms which project from the actuator body to support first and second heads, respectively, adjacent oppositely disposed data recording surfaces of the disc, a disc snubber comprising:

a snubber body disposed between the actuator arms at a location beyond an outer radius of the disc and in a clearing relationship with the actuator body so that a gap is formed as an intervening space between the snubber body and the actuator body, and the first and second actuator arms first and second bumper arms adjacent the first and second actuator arms, respectively, which extend from the snubber body to a location within the outer radius of the disc to limit deflection of the outer radius of the disc.

2. The disc drive assembly of claim 1, wherein the first and second actuator arms have corresponding first and second snubber apertures and wherein the snubber body extends into the first and second snubber apertures.

3. The disc drive assembly of claim 2 wherein the disc snubber is generally rod shaped.

4. The disc drive assembly of claim 3 wherein the snubber material is a polymeric material.

5. The disc snubber of claim 1, wherein the disc snubber is formed by a method comprising:

forming a series of snubber apertures through the actuator arms of the actuator assembly;

preparing a rod of snubber material having a cross-sectional shape substantially the same as the cross-sectional shape of the snubber apertures;

disposing the rod of snubber material into the snubber apertures;

securing the rod of snubber material in the snubber apertures; and machining the rod of snubber material to form the snubber body and bumper arms extending from the snubber body.

6. The method of claim 5 wherein the step of securing the rod comprises adhering snubber retainer members on opposing ends of the snubber body.

7. The method of claim 6 wherein the step of securing the rod further comprises heat staking the snubber retainer members to the snubber body.

8. A disc drive assembly, comprising:

a base deck supporting a spindle motor assembly;

a rotatable disc connected to the spindle motor assembly for rotation about a central axis, the disc having oppositely disposed data recording surfaces and an outer radius;

an actuator assembly supported by the base deck and comprising an actuator body configured for rotation about an axis parallel to the central axis of the disc and a pair of actuator arms which extend from the actuator body and which are moveable adjacent the data recording surfaces; and a disc snubber supported by the actuator arms and comprising:

a snubber body disposed between the actuator arms beyond the outer radius of the disc and in a clearing relationship with the actuator body so that a gap is formed so an intervening space between the snubber body and the actuator body, and the first and second actuator arms a pair of bumper arms supported by, and extending from, the snubber body toward the disc, the disc snubber selectively positionable by the actuator assembly in a first position and a second position, the bumper arms in the first position being disposed beyond the outer radius of the disc, and the bumper arms in the second position being disposed within the outer radius of the disc.

9. The disc drive assembly of claim 8 wherein each actuator arm has a snubber aperture and wherein the disc snubber is disposed within the snubber apertures.

10. The disc drive assembly of claim 9 wherein the disc snubber is generally rod shaped.

11. The disc drive assembly of claim 8, wherein the disc snubber is formed by a method comprising:

forming a series of snubber apertures through the actuator arms of the actuator assembly;

preparing a rod of snubber material having a cross-sectional shape substantially the same as the cross-sectional shape of the snubber apertures;

disposing the rod of snubber material into the snubber apertures;

securing the rod of snubber material in the snubber apertures; and machining the rod of snubber material to form the snubber body and bumper arms extending from the snubber body.

12. The method of claim 11 wherein the step of securing the rod comprises adhering snubber retainer members on opposing ends of the snubber body.

13. The method of claim 12 wherein the step of securing the rod further comprises heat staking the snubber retainer members to the snubber body.

* * * * *